(12) United States Patent
Ritchey

(10) Patent No.: US 7,574,977 B2
(45) Date of Patent: Aug. 18, 2009

(54) METHOD AND APPARATUS FOR MAKING HOLLOW, SEALED DOG TOY WITH FABRIC COVER AND CONCEALED LOOP HOLD

(76) Inventor: Sharon A. Ritchey, P.O. Box 26525, Scottsdale, AZ (US) 85255

( * ) Notice: Subject to any disclaimer, the term of this patent is extended or adjusted under 35 U.S.C. 154(b) by 88 days.

(21) Appl. No.: 11/901,844

(22) Filed: Sep. 19, 2007

(65) Prior Publication Data

US 2009/0071412 A1 Mar. 19, 2009

(51) Int. Cl.
  *A01K 29/00* (2006.01)
(52) U.S. Cl. ........................ 119/707; 119/702
(58) Field of Classification Search ................ 119/702, 119/707, 708, 709, 710, 711; D30/160; D21/707, D21/713; 473/575, 576, 596, 597, 614
  See application file for complete search history.

(56) References Cited

U.S. PATENT DOCUMENTS

| | | | | | |
|---|---|---|---|---|---|
| 4,127,268 | A | * | 11/1978 | Lindgren | 473/576 |
| 4,321,888 | A | * | 3/1982 | Topliffe | 119/709 |
| 4,657,253 | A | * | 4/1987 | Lerner et al. | 473/576 |
| 4,884,807 | A | * | 12/1989 | Welch | 473/575 |
| 5,265,559 | A | * | 11/1993 | Borell | 119/707 |
| 5,282,777 | A | * | 2/1994 | Myers | 482/122 |
| D356,354 | S | * | 3/1995 | Killion | D21/436 |
| D358,911 | S | * | 5/1995 | Hotta et al. | D30/160 |
| 5,961,406 | A | * | 10/1999 | Hass | 473/576 |
| D493,260 | S | * | 7/2004 | Oblack | D30/160 |
| D523,190 | S | * | 6/2006 | Oblack | D30/160 |
| 7,219,626 | B2 | * | 5/2007 | Hurwitz | 119/707 |
| D583,421 | S | * | 12/2008 | Slinker | D21/398 |

* cited by examiner

*Primary Examiner*—T. Nguyen
(74) *Attorney, Agent, or Firm*—Tod R. Nissle, P.C.

(57) ABSTRACT

A toy for an animal, in particular a dog, includes a hollow core, a fabric cover attached to the exterior of the core, a loop hold having ends secured to the toy intermediate the core and the fabric cover and having an intermediate section extending outwardly from the core and the fabric cover, and an elongate pliable piece of material fastening to and concealing the loop hold.

2 Claims, 2 Drawing Sheets

METHOD AND APPARATUS FOR MAKING HOLLOW, SEALED DOG TOY WITH FABRIC COVER AND CONCEALED LOOP HOLD

This invention related to animal toys.

More particularly, the invention relates to a dog toy that minimizes the likelihood that an animal will chew on and damage a toy.

In a further respect, the invention relates to a dog toy including a core, a fabric cover attached to the exterior of the core, and a loop hold that is secured to the toy without requiring that the core be punctured or pierced in order to secure the loop hold to the toy.

Many toys are provided with a loop hold. A loop hold is a strip of material with a pair of ends that are each attached to a toy and with a central portion that extends intermediate the ends and outwardly from the toy to form a loop. The loop hold enables rope, cord, or other materials to be mounted on the toy by tying or attaching the rope to the loop. In most case the loop hold is secured to a toy by stitching or with rivets or other fasteners that puncture or pierce the toy. When the toy includes a hollow sealed core, puncturing the toy is not practical or desired. Further, in the event the toy includes a fabric cover, attempting to simply glue a loop hold to the cover ordinarily is not satisfactory because a dog readily tears the loop hold off the toy along with a portion of the fabric cover.

Accordingly, it would be highly desirable to provide an improved dog toy and method for making the same that would include a loop hold.

Therefore, it is an object of the instant invention to provide an improved dog toy.

A further object of the invention is to provide an improved dog toy of the type including a hollow core, a fabric cover attached to the exterior of the cover, and a loop hold securely mounted on the toy.

Another object of the invention is to provide a method of making a dog toy of the type described which does not require that the wall of the hollow core be pierced in order to mount a loop hold on the exterior of the toy.

Still a further object of the invention is to provide an improved dog toy of the type described in which the loop hold is concealed to reduce the likelihood that a dog will find and chew the loop hold.

These and other, further and more specific objects and advantages of the inventions will be apparent to those skilled in the art from the following detailed description thereof, taken in conjunction with the drawings, in which.

Figure 1:
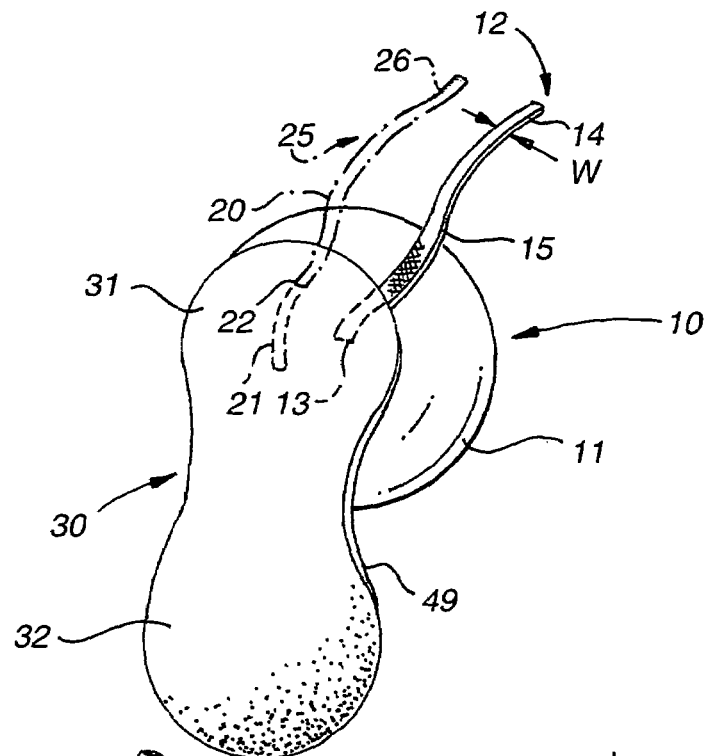
FIG. 1 is a perspective view illustrating a method for constructing a dog toy in accordance with the invention.

Briefly, in accordance with my invention, I provide an improved method for making a dog toy. The method comprises the steps of providing a hollow spherical housing including an exterior surface; providing a first fabric cover piece shaped and dimensioned to wrap around and conform to a first portion of the exterior surface, the cover having an outer side and an inner side and first and second ends; providing a second fabric cover piece shaped and dimensioned to wrap around and conform to a second portion of the exterior surface and to interfit with the first fabric cover pieces such that the first and second cover pieces substantially cover the exterior surface, the second cover having an outer side and an inner side and first and second ends; forming first and second openings in at least one of a pair comprising the first and second fabric cover pieces; providing a pliable loop hold strip having first and second ends and an intermediate section between the ends; threading the loop hold through the first and second openings such that the ends of the loop hold are located on the inner side of at least one of a pair comprising the first and second cover pieces, and the intermediate section extends outwardly through said openings and is located on the outer side of at least one of a pair comprising the first and second cover pieces; gluing the inner sides of the first and second cover pieces to the exterior surface of the housing such that the first and second ends are glued between at least one of a pair consisting of the first and second cover pieces and the exterior surface and the intermediate section of the loop hold extends outwardly through the openings and away from the housing; and, fastening an elongate pliable member to said intermediate section of said loop hold such that a portion of said pliable member covers and hides from view said loop hold.

In another embodiment of the invention, I provide an improved dog toy. The toy comprises a hollow spherical housing including an exterior surface; a first fabric cover piece wrapping around and conforming to a first portion of the exterior surface, the cover having an outer side and an inner side and first and second ends; a second fabric cover piece wrapping around and conforming to a second portion of the exterior surface and interfitting with the first fabric cover pieces such that the first and second cover pieces substantially cover the exterior surface, the second cover having an outer side and an inner side and first and second ends; first and second openings in at least one of a pair comprising the first and second fabric cover pieces; a pliable loop hold strip having first and second ends and an intermediate section between the ends and threaded through the first and second openings such that the ends of the loop hold are located on the inner side of at least one of a pair comprising the first and second cover pieces, and the intermediate section extends outwardly through the openings and is located on the outer side of at least one of a pair comprising the first and second cover pieces; adhesive securing the inner sides of the first and second cover pieces to the exterior surface of the housing such that the first and second ends are glued between at least one of a pair consisting of the first and second cover pieces and the exterior surface and the intermediate section of the loop hold extends outwardly through the openings and away from the housing; and, an elongate pliable member attached to the intermediate section of the loop hold such that a portion of the pliable member covers and hides the loop hold from view.

Turning now to the drawings, which depict the invention for purposes of explanation and not by way of limitation of the invention, and in which like reference characters refer to corresponding elements throughout the several views, FIGS. 1 to 4 illustrate various methods of constructing the animal toy of the invention.

As utilized herein the term rubber includes natural or synthetic rubbers and polymers or other components which produce elastomeric materials having the properties of a rubber.

The fabric used to cover the exterior surface 11 of the core 10 of the toy of the invention can be any desired fabric, but presently preferably is felt because felt provides a soft surface which reduces the strength of a blow to an animal when the toy inadvertently strikes an animal. Felt also resiliently compresses to absorb some of the force of the blow. While any felt can be utilized, the preferred felt comprises a firm woven cloth of wool or cotton heavily napped and shrunk to form a smooth resilient texture. As used herein, the term fabric includes material made by weaving, felting, knitting, knotting, bonding, or crocheting natural or synthetic fibers and/or filaments. Examples of natural fibers are, without limitation, cotton, wool, and silver. Examples of synthetic fibers are, without limitation, nylon, rayon and KEVLAR(™). Felts are, as earlier noted, presently preferred in the practice of the invention.

The core 10 of the toy of the invention preferably, but not necessarily, comprises a compressibly elastically deformable hollow thin walled elastomer core that circumscribes and encloses a selected compressible gaseous volume. However, by way of example, another core used in the practice of the invention can comprise a solid compressible elastically deformable elastomer core like a soft rubber ball.

The shape of core 10 illustrated in FIGS. 1 to 4 is spherical, but the shape of core 10 can vary as desired and can, for example, be shaped like a bone, a cylinder, etc.

At least one strip 12 is provided that has ends 13 and 14 and an intermediate portion 15 between ends 13 and 14. Portion 15 forms, as will be seen, a loop when the toy is fully assembly. While strip 12 can comprise any desired material, strip 12 presently preferably is pliable and is comprises of one or more fabrics. Making strip 12 from a hard, rigid material is not preferred in the practice of the invention because a hard, rigid material is more likely to injure an animal. A hard rigid material is also less likely to provide the surface area or absorption that a fabric provides to facilitate an adhesive bonding to and/or with the fabric.

Fabric piece 30 includes ends 31 and 32 and peripheral edge 49. Fabric piece 40 includes ends 41 and 42 and peripheral edge 48. Pieces 30 and 40 are shaped and dimensioned to wrap around and conform to the exterior surface 11 of spherical core 10 and to interfit cover substantially the entire surface 11. Accordingly, pieces 30 and 40 and shaped and dimensioned much like the pieces of material that interfit and form the cover of a baseball. Each piece 30, 40 has an inner surface that is glued to the exterior surface 11 of core 10, and has an outer surface 30A, 40A. The outer surfaces 30A, 40A of pieces 30 and 40, respectively, are visible in FIGS. 1 to 4. In the practice of the invention, at least two pieces of fabric are usually, but not necessarily, utilized to cover a core so that a seam line like the seam space or line 90 between edges 48 and 49 in FIG. 3 is formed. A strip of adhesive 50 is preferably, although not necessarily, used to seal together edges 48 and 49.

In the presently preferred embodiment of the invention, a pair of spaced apart slits or other appropriately shaped openings 43,44 are formed through fabric piece 40 at points within peripheral edge 48. Adhesive is applied to exterior surface 11 (and/or to the inner surfaces of fabric pieces 30 and 40). One end 13 of strip 12 is pressed against surface 11 and end 31 of piece 30 is pressed against surface 11 to cover end 13 in the manner illustrated in FIG. 1.

Figure 2:
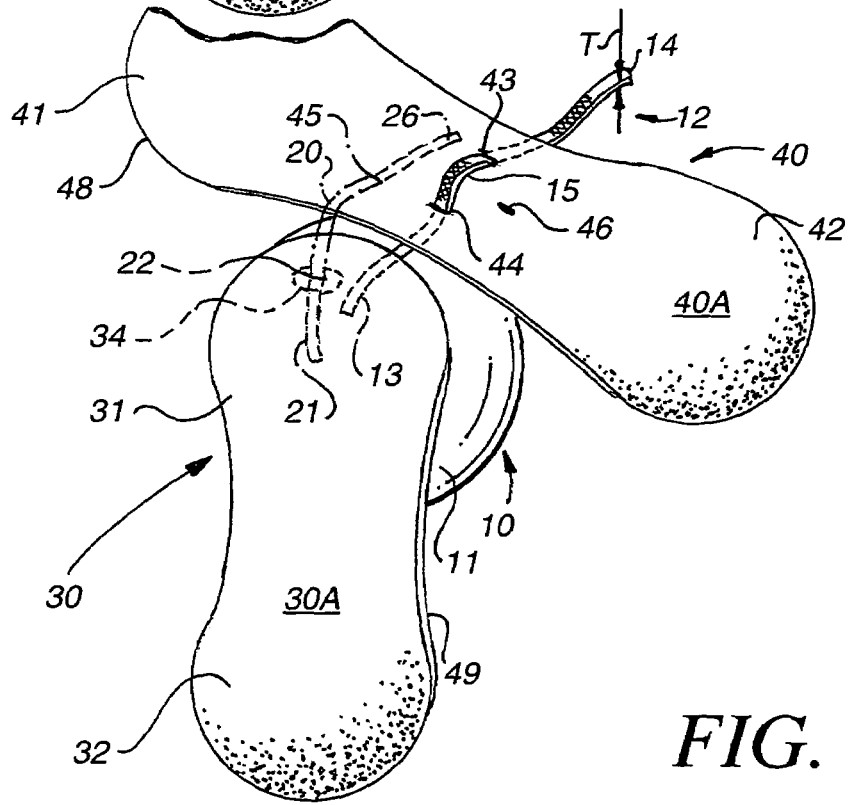
FIG. 2 is a perspective view further illustrating a method for constructing a dog toy in accordance with the invention.
Figure 3:
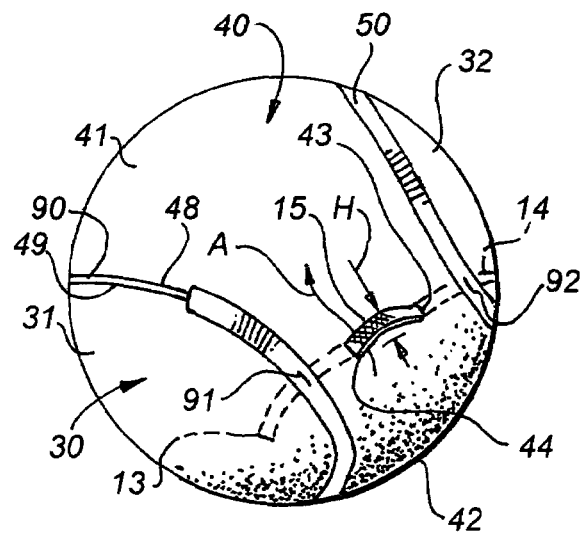
FIG. 3 is perspective view further illustrating a method for constructing a dog toy in accordance with the invention; and, FIG. 4 is a perspective view further illustrating a method for constructing a dog toy in accordance with the invention.

In FIG. 2, end 14 is threaded through openings 43 and 44 such that end 14 extends beneath the inner surface of piece 30, and such that intermediate potion 15 extends upwardly from the outer surface 40A of piece 40 to form a loop hold. As would be appreciated by those of skill in the art, if desired, end 14 can be threaded through one or both of openings 43, 44 before end 13 is applied to surface 11 and is covered by end 31 of piece 30. Or, end 13 can be positioned in contact with surface 11, ends 14 threaded through one or both openings 43 and 44, and end 31 then pressed against surface 11 over end 13, etc. The particular sequence in which piece 12 is threaded through openings 43 and 44 and ends 13 and 14 are secured to surface 11 beneath at least one of pieces 30 and 40 normally is not critical in the practice of the invention.

FIG. 2 illustrates toy components including the core 10, pieces 30 and 40, and strip 12. The adhesive on surface 11 and/or the inner surfaces of pieces 30 and 40 is not visible in FIG. 2.

Fabric piece 40 is pressed against the exterior surface 11 of core 10.

The remainder of fabric piece 30 is pressed against the exterior surface 11 of core 10 such that pieces 30 and 40 interfit like the two pieces comprising the cover of a baseball.

The toy components of FIG. 2 are illustrated in FIG. 3 after their assembly has been completed, and after a strip of adhesive 50 has been applied to the seam extending between and along the peripheral edges 48 and 49 of pieces 40 and 30. When strip 50 has been fully applied, it extends along the complete length, or at least along substantially the complete length, of the seam between edge 48 and 49, much like the stitching on a baseball extends along the complete length of the seam formed by the two pieces of material comprising the cover of the baseball. In FIG. 3, however, a portion of strip 50 is omitted so that seam space or line 90 and the seam-forming edges 48 and 49 of pieces 40 and 30 can be seen.

The particular adhesive utilized to attach fabric pieces 30 and 40 to surface 11 and to connect edges 48 and 49 to each other and/or surface 11 can vary as desired and can comprise, by way of example and not limitation, cyanoacrylate, rubber cement, or any other desired adhesive(s). The adhesive utilized may or may not be susceptible to being cured by heat. In addition to being applied in the areas previously mentioned, the adhesive can be applied 34 around and contacting slots 22 that are formed in fabric pieces 30 and 40. Such adhesive also contacts and preferably covers portions of strip 12, 25 at slot 22, and can contact surface 11 at points below slot 22. In particular, the adhesive produces a stronger bond if the adhesive covers a portion of the ends of strip 12,25 and then also contacts and adheres to points on surface 11 adjacent strip and/or adheres to portions of fabric pieces 30 and 40 adjacent strip 12, 25. The adhesive selected can, if desired, "wet" and absorb into portions of fabric pieces 30 and 40, or, alternatively simply adhere to the surface of and not absorb or soak into fabric pieces 30 and 40. The adhesive 34 is preferably, but not necessarily, also visible on the exterior of the toy (and covers a portion of one or more fabric pieces 30 and 40), in the same manner that the adhesive strip 50 is visible on the exterior of the toy (and covers seam line 90 and a portion of each fabric piece 30 and 40.

One reason the construction illustrated in FIG. 3 is presently preferred in the practice of the invention is that each end 13 extends under and is further secured by a portion of strip 50.

The proximate end 61 of a length of rope 60 can be slid intermediate loop 15 and fabric piece 40 in the manner indicated by arrow A in FIG. 3, and a knot 63 (FIG. 4) then tied in end 61 to secure rope 60 to loop 15. Distal end 62 of rope 60 extends outwardly from knot 63. Knot 63 is sized and shaped and dimensioned to cover and conceal loop 15 to reduce the risk that a dog will attempt to chew loop 15. It is not necessary that knot 63 be sized to conceal loop 15, but such is presently preferred in the practice of the invention and is believed to extend the usable life of the toy when the toy is used by a dog.

Any desired object other than rope 60 can be tied or otherwise secured to loop 15. The object secured to loop 15 is preferably, however, pliable and soft and comprises lengths of cloth, rope, or other fabric materials.

Figure 4:
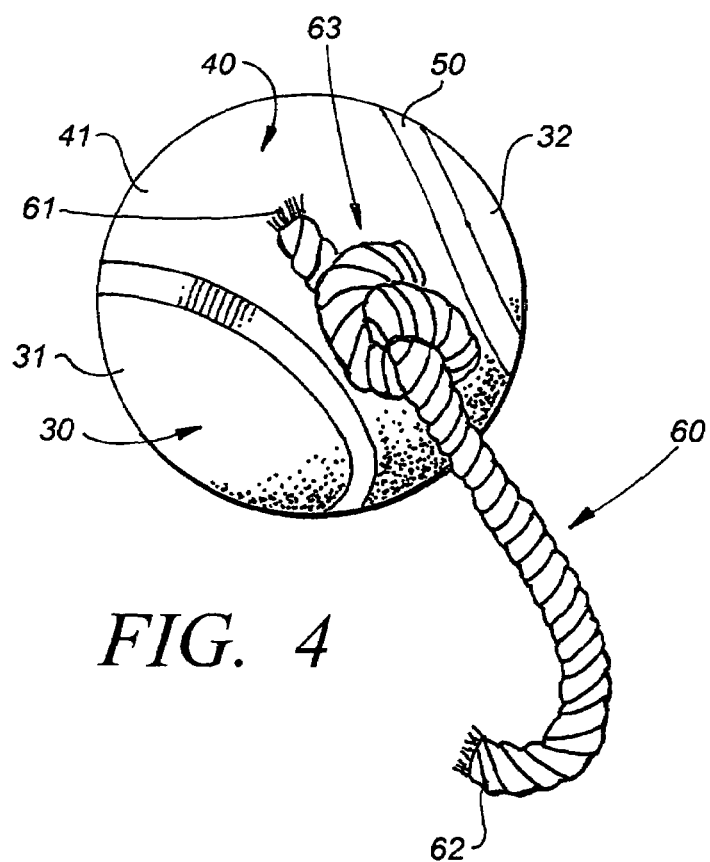

As would be appreciated by those of skill in the art, two or more strips 12 of material can be secured to the toy of FIG. 4 at different spaced apart locations so that more than one loop hold is produced on the toy. Also, in order to strengthen a loop hold, two or more strips 12 can be secured to the toy at the same, or substantially the same, location on the toy.

In another embodiment of the invention, instead of forming a pair of openings 43, 44 at points within and circumscribed by the peripheral edge 49 of a single fabric piece 40, only a single opening 46 is formed and intermediate section 15 extends outwardly through opening 46 to form a loop. The method of constructing this embodiment of the invention is substantially identical to the method described above herein, except that instead of threading end 14 through a pair of slits 43 and 44, strip 12 is threaded into and through slot 46 such that intermediate section 15 extends outwardly through slit 46 (or another appropriately shaped opening) and away from core 10, and ends 13 and 14 extend in an opposite direction downwardly away from slot 46 in the same manner that ends 13 and 14 extend downwardly away from slots 44 and 43, respectively, in FIG. 2.

In a further embodiment of the invention, instead of forming a pair of openings 43 and 44 within and circumscribed by the peripheral edge 48 of a single fabric piece 40, one of the openings is formed 33 within the peripheral edge 49 of fabric piece 30 and the other opening 45 is formed within the peripheral edge 48 of the other fabric piece 40, in the manner illustrated in FIGS. 1 and 2. The method of constructing this embodiment of the invention is otherwise substantially identical to the method described above herein, In still another embodiment of the invention, instead of forming openings and circumscribed by within the peripheral edge of either fabric piece 30 and 40, the opening through which the intermediate section 15 extends comprised a portion of the seam formed between the peripheral edges 48 and 49 of fabric pieces 30 and 40. The method of constructing this embodiment of the invention is otherwise substantially identical to the method described above herein. For example, end 13 of strip 12 is (after adhesive is applied to surface 11, the inner surface of fabric piece 30, and/or to end 13) secured by placing end 13 against surface 11 and end 13 is covered by gluing fabric piece 30 to surface 11. End 14 is then placed against surface 11 and piece 40 glued to surface 11 such that pieces 30 and 40 interfit in the manner illustrated in FIG. 3, such that end 14 is covered by piece 40, and such that intermediate section 15 forms a loop by extending upwardly through the seam between edges 48 and 49 and away from core 10. In this manner, section 15 forms a loop that extends outwardly away from the seam between pieces 30 and 40.

In still a further embodiment of the invention, instead of forming a pair of openings 43 and 44 within the peripheral edge 49, 48 of one fabric piece 30 or 40, and instead of forming one opening 22 in one fabric piece 30 and a second opening 45 in another fabric piece 40, at least one of the pair of openings is formed between and exists at a portion of the seam line 90. For example, in FIG. 3, instead of the pair of openings for strip 12 being openings 43 and 44, the pair of openings can comprise spaces, or openings, 91 and 92 along a portion of the seam line 90. Or, one opening for strip 12 can comprise one of the openings 91 and 92 and the other opening for strip 12 can comprise an opening 43, 44 that is formed within the peripheral edge 48 of a fabric piece 40. For sake of simplicity, whenever a reference is made herein to forming openings in fabric cover pieces 30 and/or 40, such cover openings 43, 44, 22, 45 formed within the peripheral edge 48, 49 of a fabric piece 40, 30 or openings 91, 92 formed at, by and/or between the peripheral edges 48, 49 of a fabric piece 40, 40.

Strip 12 can have a length sufficient for strip 12 to extend completely around, or any desired distance around, core 10.

An important feature of the invention comprises preforming openings 22, 43 to 45 in fabric pieces and then threading strip 12 through the openings 22, 45, 43, 44 formed in or by fabric pieces 30 and 40 before the fabric pieces are glued to the exterior surface 11 of core 10. Substantially the entire inner surface of each fabric piece 30 and 40 is glued to surface 11, particularly the portions of the inner surfaces around each opening 22, 45, 43, 44 through which intermediate portion 15 extends.

As the distance between slots 43 and 44 increases, the magnitude of the outward force generated against a fabric piece 30, 40 at points adjacent a slot 43 and 44 when a dog pulls rope 60 outwardly away from core 10 is reduced. Similarly, as the maximum profile, or height, that loop hold 15 extends outwardly away from fabric piece(s) 30, 40 is reduced, the magnitude of the outward force generated against a fabric piece 30, 40 at point adjacent a slot 43 is also reduced. Instead, a greater proportion of the force magnitude pulls ends 13 and 14 in a shearing manner in a direction generally parallel to the surface 11 of the core 10.

It is preferred, although not necessary, that strip 12 be a relatively flat, thin strip. One reason for this is that a flat thin strip has a low profile and can not be readily detected as extending beneath cover pieces 30 and 40. Further, the loop portion 15 of a flat thin strip "lies down" on and is substantially flush with the exterior surface of a fabric piece 40, which facilitates using existing molding equipment in the event fabric pieces are, while being adhered to exterior surface 11, compressed in a mold. The normal unstressed width W (FIG. 1) of strip 12 is in the range of one-eighth of an inch to one inch, and is preferably in the range of three-sixteenths of an inch to one half inch. The normal unstressed thickness T (FIG. 2) of strip 12 is no greater than one-eighth of an inch, and preferably is no greater than one-sixteenth of an inch. The unstressed thickness T of strip 12 refers to the thickness of strip 12 both when strip 12 is lying on a surface subject only to the normal forces generated by gravity, when strip 12 is not subjected to any compressive forces such as, for example, compressive forces applied by a mold, and when strip 12 is not subject to an tensile, or stretching forces. Strip 12 is, as noted, preferably comprised of fabric, and when strip 12 is stressed by pulling and stretching strip 12, or, when strip 12 is stressed by compressing strip 12, the width and thickness of strip 12 is typically altered in comparison to the normal unstressed state of strip 12. In addition, when the distance H (FIG. 3) that loop 15 extends above the surface of a fabric piece 40 is minimized, the strength of strip 12 and the likelihood that portions of fabric piece 40 adjacent openings 43 and 44 will be pulled away from surface 11 is minimized. As would be appreciated by those of skill in the art, this occurs because when loop 15 is stressed and is pulled in a direction that is normal to and away from the exterior surface of the toy, a significant portion of the pulling force applied to loop 15 translates to the ends 13 and 14 of strip 12 and generates forces that act tangentially with respect to the rounded, spherical surface 11 of the core 10. The tangential forces can act to in part actually force portions of ends 13 and 14 against surface 11. The greater the distance between openings 43 and 44, the greater the portion or magnitude of an outward pulling force on loop 15 that tends to force portions of ends 13 and 14 against surface 11. On a ball or other toy with a diameter or greatest width in the range of two and four inches, the preferred greatest distance H (FIG. 3) that an unstressed portion of loop 15 extends outwardly from the surface of a fabric piece 40 is, although not necessarily, in the range of one-eighth to three-fourths of an inch, preferably one-sixteenth of an inch to one-half of an inch. Loop 15 is not stressed as long as it is not being pulled on outwardly, laterally, or in any other direction.

One particular advantage of the toy of the invention is that it does not require that the wall of a hollow (or even solid ball or other toy) toy be pieced in order to attach a loop hold. This means that if the toy comprises, for example, a hollow sealed toy, the seal is not broken. It also means that if the toy is elastic and deformable and includes a hollow, and a squeaker is mounted in the toy to extend into the hollow, the wall of the hollow need not be pierced when a loop hold is attached to the toy. If the wall of the hollow is pierced, air may escape through to opening formed by the piercing instead of escaping through the squeaker, which can reduce or eliminate the proper functioning of the squeaker in producing noise when the toy is elastically squeezed.

Having described my invention in such terms as to enable those of skill in the art to understand and practice the invention, and having described the presently preferred embodiments thereof,

I claim:

1. A method for making a dog toy, said method comprising the steps of
   (a) providing a hollow housing including an exterior surface, at least a portion of said exterior surface being rounded;
   (b) providing at least first and second fabric cover pieces,
      (i) said first fabric cover piece shaped and dimensioned to wrap around and conform to a first portion of said exterior surface, said first fabric cover piece having an outer side and an inner side and first and second ends, and
      (ii) said second fabric cover piece shaped and dimensioned to wrap around and conform to a second portion of said exterior surface and to interfit with said first fabric cover pieces such that said first and said second fabric cover pieces substantially cover said exterior surface and form a seam space extending therealong, said second fabric cover piece having and outer side and an inner side and first and second ends;
   (d) forming first and second openings in at least one of a pair comprising said first and second fabric cover pieces;
   (e) providing a pliable loop hold strip having first and second ends and an intermediate section between said ends;
   (f) threading said loop hold strip through said first and second openings such that
      (i) said ends of said loop hold strip are located on said inner side of at least one of a pair comprising said first and second fabric cover pieces, and
      (ii) said intermediate section extends outwardly through said openings and is located on said outer side of at least one of a pair comprising said first and second fabric cover pieces;
   (g) gluing said inner sides of said first and second fabric cover pieces to said exterior surface of said housing such that said first and second ends are glued between at least one of a pair consisting of said first and second fabric cover pieces and said exterior surface and said intermediate section of said loop hold strip extends outwardly through said openings and away from said housing and,
   (h) securing, after said first and second fabric cover pieces are glued to said housing in step (g), with additional adhesive at least a portion of each of said ends of said loop hold strip at at least one location in a group consisting of said first and second openings and said seam, said adhesive covering a portion of each of said ends.

2. A dog toy comprising
   (a) a hollow housing including an exterior surface, at least a portion of said exterior surface being rounded;
   (b) at least first and second fabric cover pieces,
      (i) said first fabric cover piece wrapping around and conforming to a first portion of said exterior surface, said first fabric cover piece having an outer side and an inner side and first and second ends, and
      (ii) said second fabric cover piece wrapping around and conforming to a second portion of said exterior surface and interfitting with said first fabric cover pieces such that said first and second fabric cover pieces substantially cover said exterior surface and forming a seam space extending therealong, said second fabric cover piece having and outer side and an inner side and first and second ends;
   (d) first and second openings in at least one of a pair comprising said first and second fabric cover pieces;
   (e) a pliable loop hold strip having first and second ends and an intermediate section between said ends and threaded through said first and second openings such that
      (i) said ends of said loop hold strip are located on said inner side of at least one of a pair comprising said first and second fabric cover pieces, and
      (ii) said intermediate section extends outwardly through said openings and is located on said outer side of at least one of a pair comprising said first and second fabric cover pieces;
   (f) primary adhesive securing said inner sides of said first and second fabric cover pieces to said exterior surface of said housing such that said first and second ends are glued between at least one of a pair consisting of said first and second fabric cover pieces and said exterior surface and said intermediate section of said loop hold strip extends outwardly through said openings and away from said housing; and,
   (g) secondary adhesive securing at least a portion of each of said ends of said loop hold strip at least one location in a group consisting of said first and second openings and said seam, said secondary adhesive covering a portion of each of said ends.

* * * * *